Dec. 8, 1936. G. A. VISSAC 2,063,533
AIR CLEANER AND CLASSIFIER FOR FINE COALS
Filed April 14, 1934 4 Sheets-Sheet 1

INVENTOR
GUSTAVE A. VISSAC
BY Eugene C. Stevens
ATTY

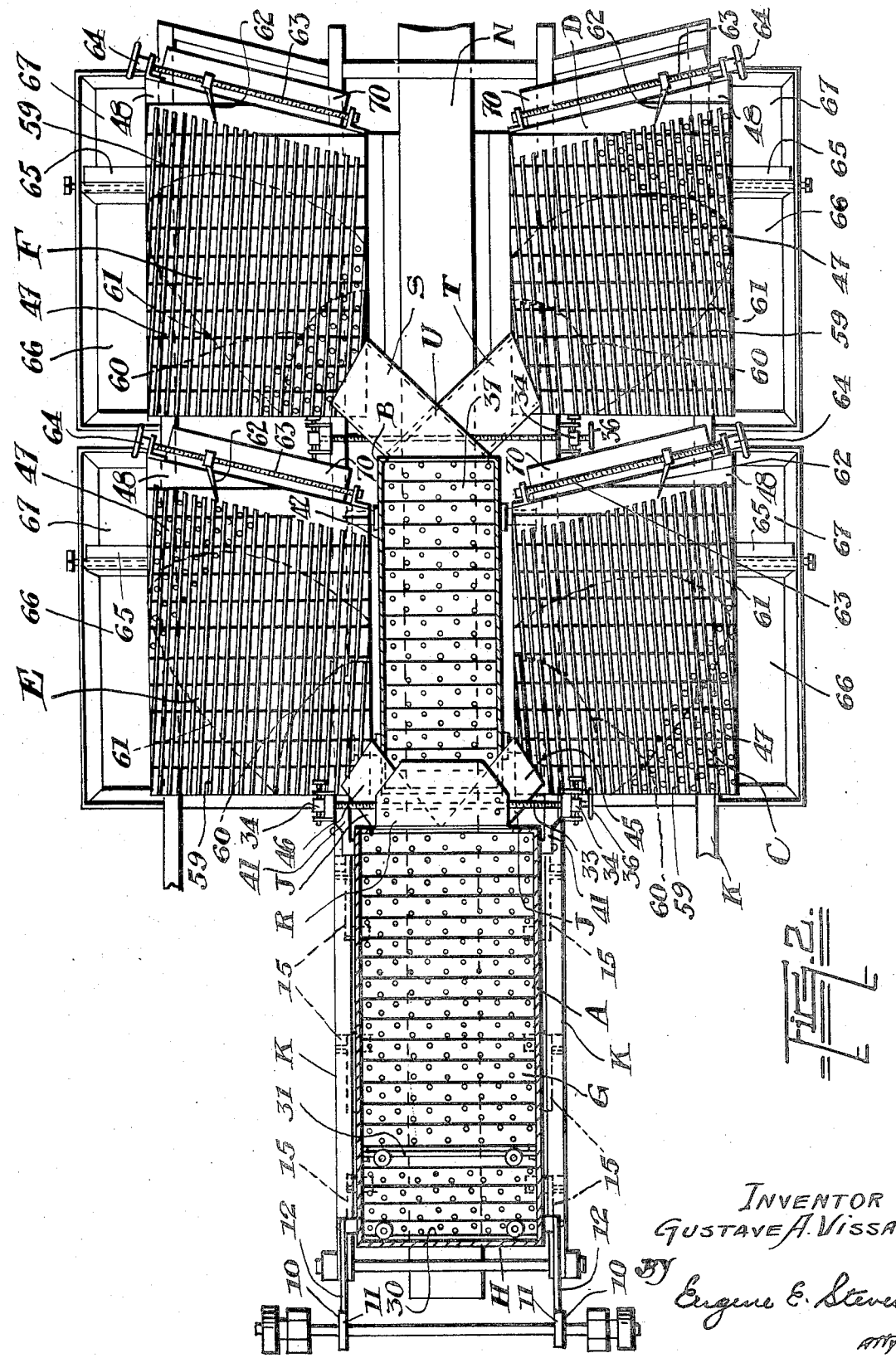

Dec. 8, 1936.    G. A. VISSAC    2,063,533
AIR CLEANER AND CLASSIFIER FOR FINE COALS
Filed April 14, 1934    4 Sheets-Sheet 3
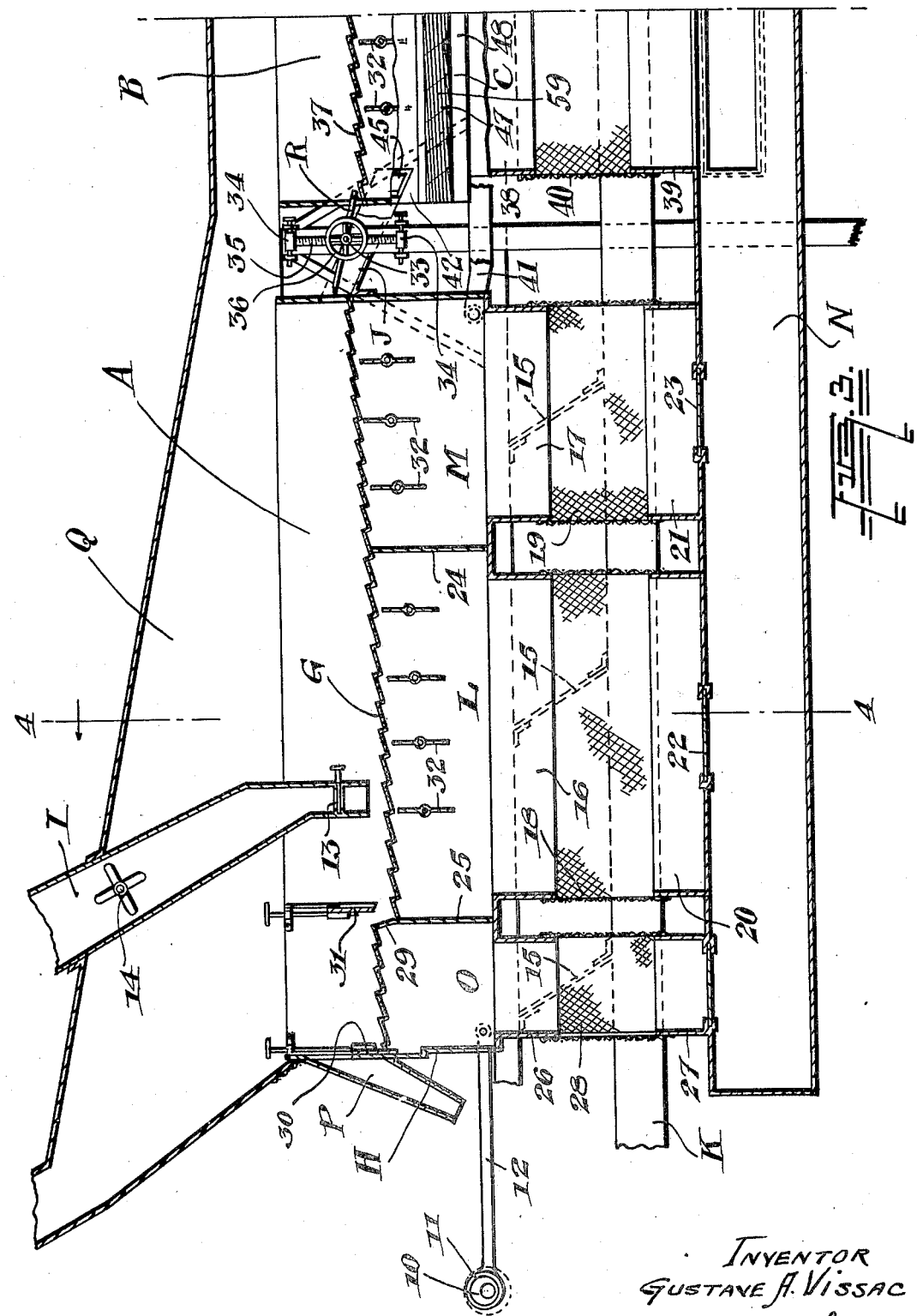
Inventor
Gustave A. Vissac
By Eugene E. Stevens
Atty.

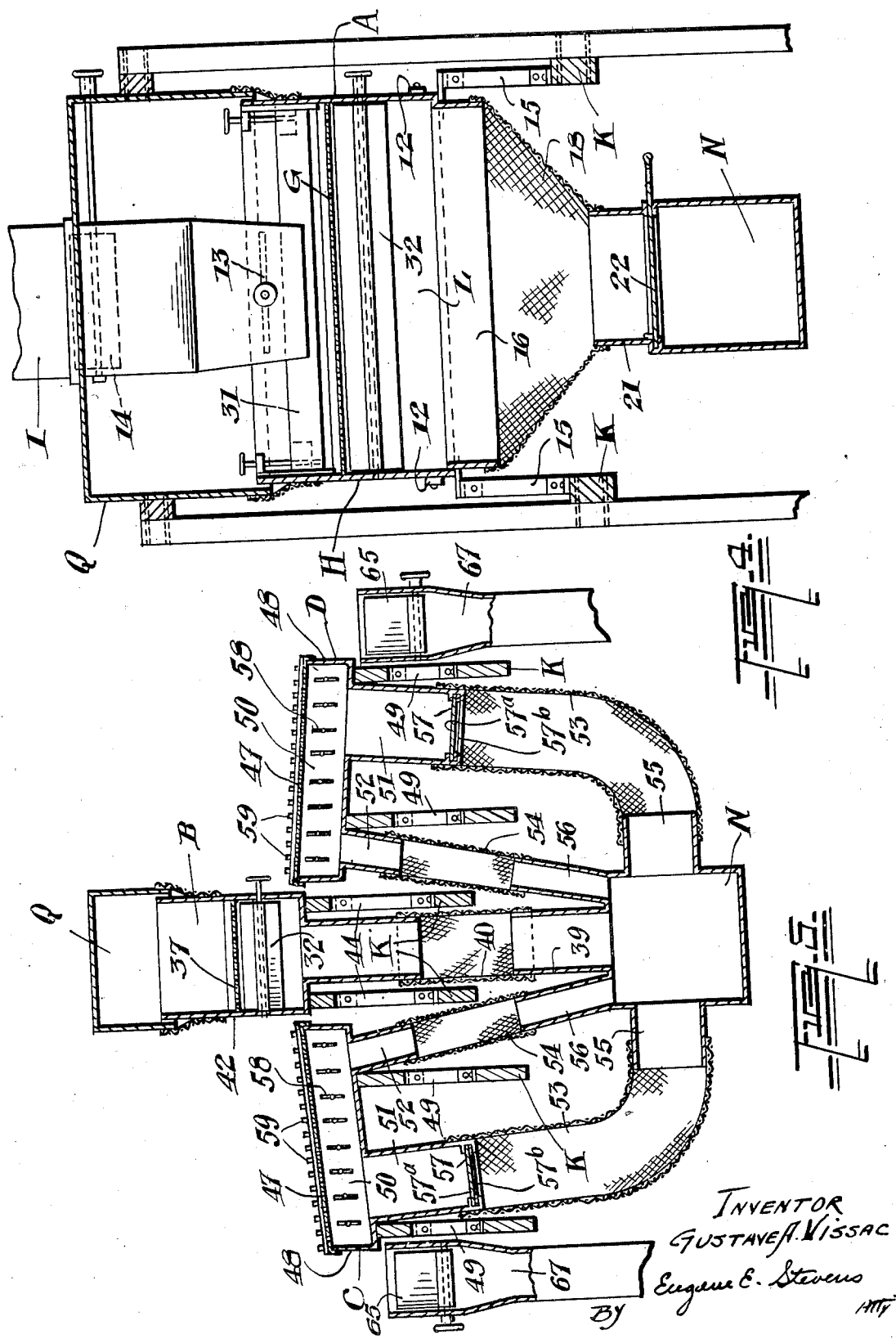

Patented Dec. 8, 1936

2,063,533

UNITED STATES PATENT OFFICE 2,063,533

AIR CLEANER AND CLASSIFIER FOR FINE COALS

Gustave Andre Vissac, Blairmore, Alberta, Canada

Application April 14, 1934, Serial No. 720,643
In Canada June 10, 1933

5 Claims. (Cl. 209—467)

This invention relates to improvements in air cleaners and classifiers for fine coal and like material, and the general object of the invention is to provide a more efficient and economical method and apparatus for effecting the classification and separation of material, particularly the cleaning and separation from fine coal of impurities and non-combustible particles.

A further object of the invention is to provide a more effective application and distribution of the air current in a shaking screening.

A still further object of the invention is to provide means by which classification and separation may be accomplished in a plurality of steps, in the first of which classification would be effected into equivalent particles, that is to say particles that have the same speed of free fall in air, which particles are then separately treated to effect separation.

In its construction the invention comprises two air troughs and a plurality of air tables. The air troughs include shaking stepped screens and means for supplying a regulated air current to the underside of the screen. The material passing from the first trough is sliced by novel means, one slice passing to the second trough and the other slice being distributed to the air tables. From the second trough the material is distributed to other air tables. On the air tables the material is separated through the shaking screen riffles and deflecting bars, all as hereinafter more fully set forth and described in the accompanying specification and drawings.

In the drawings—

Figure 2 is a plan view of the invention with the top hood removed.

Figure 3 is a longitudial sectional elevation of the first trough and a portion of the second trough.

Figure 4 is a section on the line 4—4 of Figure 3.

Figure 5 is a section on the line 5—5 of Figure 1.

In the drawings like characters of reference indicate corresponding parts in all the figures.

Figure 1:
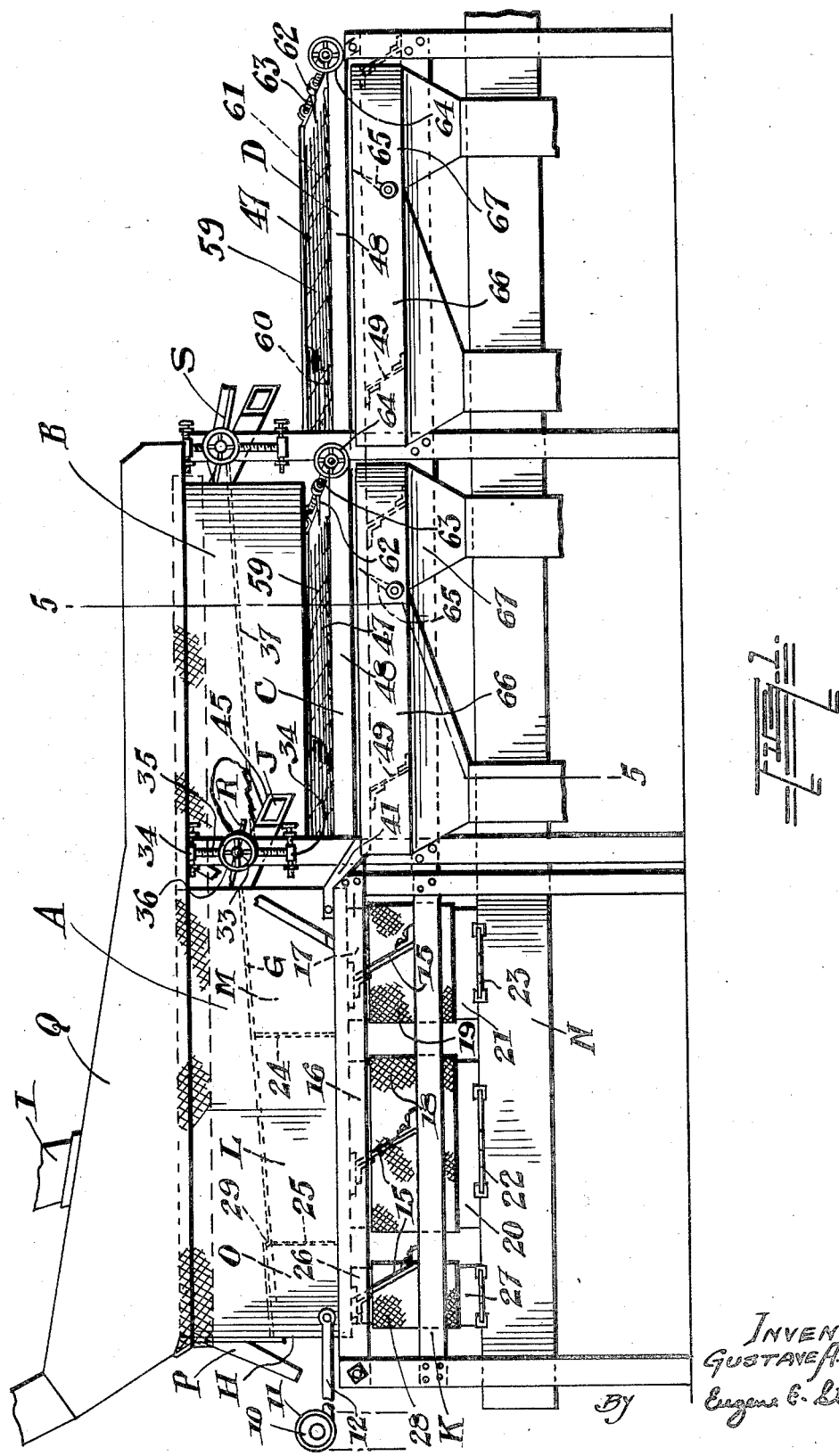
Figure 1 is a side elevation of the embodiment of the invention.

Referring to the drawings, A indicates the primary air trough, B the secondary air trough, and C, D, E and F the air tables.

The primary air trough A includes a shaking screen G extending substantially the whole length of the trough formed with small corrugations and step shaped. It is conveniently formed of a screen with $\frac{1}{32}$ of an inch opening, 40% openings for 60% blank, and is set at a slope of about 7° against the direction of flow. It is supported in a suitable shaking frame H which has a shaking motion imparted to it by convenient means, such as the eccentrics 10 connected by a strap 11 and link 12 with the frame H.

The coal is delivered to the screen from a chute I having a suitable control valve or gate 13 at its lower extremity and a rotary feeder 14 of convenient design in it. The chute terminates a short distance above the top of the trough. By reason of the shaking motion the coal travels towards the right hand end of the screen, as seen in Figure 3, and finally reaches the discharge chute J, the steps in the screen preventing the return of the coal on the back stroke. It is desirable to provide means by which the back stroke may be made initially quicker than the forward stroke. This may be done by a suitable spring connection. As shown inclined springs 15 are provided extending between the shaking frame H and the main fixed frame K of the apparatus. It will be seen that on the return of the spring the action will quickly take up any play in the connection, and if further flexibility is desired it may be allowed for by constructing the connecting member 12 of spring material.

The underside of the screen G communicates with air chambers L and M, which are connected to the main air supply pipe N through flexible connecting means such as the pipes 16 and 17 leading from the bottom of the chambers L and M and connected by suitable flexible couplings 18 and 19 of suitable fabric to pipes 20 and 21 leading to the main air pipe N which may be controlled by suitable gates 22 and 23. By means of these gates it is possible to regulate and distribute the pressure between the chambers L and M. The air pressure is maintained in the pipe N by means of a suitable blower not shown.

The chambers L and M are separated by a partition 24. Adjacent to the compartment L, at the lower end of the screen, is a dust compartment O, separated from the compartment L by a partition 25 and being connected to the air pipe N by pipes 26 and 27 and the flexible fabric connecter 28. The screen above the compartment O is a distance above the portion of the screen extending above the compartments L and M to thereby provide a step 29, the functions of which will hereinafter appear. A dust chute P is provided at the end of the screen from which the dust may be discharged. It may be controlled by a suitable gate 30. Further regulation is provided for by an adjustable gate or dam 31 arranged adjacent to the step 29.

To distribute the air pressure over the screen G a plurality of spaced gates 32 may be provided which are conveniently pivotally mounted and adjustable in position.

To collect the fine dust a hood Q is provided over both troughs A and B connected to a suitable exhaust fan whereby the finest dust may be removed. Means are provided by which the material passing through the chute J may be sliced. I have shown for this purpose a slicing knife R adjustably mounted on the frame K and not partaking of the shaking motion of the screen. This knife is preferably mounted on a shaft 33 carried by bearing blocks 34 vertically adjustable on screws 35, shaft 33 being capable of being turned by handwheel 36, so that both the angular position and vertical elevation of the knife may be adjusted.

The trough B is of similar form to the trough A, having a similar screen 37 having a space below connected by pipes 38 and 39 and a flexible coupling 40 with the air pipe N. A shaking motion is imparted to it by a connecting link 41, which connects the frame H with the frame 42 of the second trough. The second trough is supported, as is the first, by inclined springs 44 similar to the springs 15.

Only the material passing above the knife R goes to the second trough. The material below the knife is divided between chutes 45 and 46, which lead respectively to the air tables C and E.

Each of the air tables, C, D, E and F is of similar construction and includes a shaking screen 47 carried by a shaking frame 48 supported on inclined springs 49, the air chamber 50 on the underside of the screen being connected by a plurality of pipes 51 and 52 and flexible fabric pipe connections 53 and 54 to pipes 55 and 56 connected to the main air pipe N. The pipe 51 is larger than the pipe 52 and is provided with a suitable gate 57. The distribution of the air beneath the screen is effected by a plurality of spaced pivotally mounted gates 58. A further regulation of the air may be accomplished by constructing the gate 57 in two parts, one a fixed plate 57a and the other a sliding plate 57b, which plates are formed with perforations designed to register with each other according to a degree controlled by the adjusted position of the movable plate which may be controlled by any convenient manually operable means.

The surface of each of the air tables is formed with a series of parallel tapered riffles 59, the height of which depends on the size of material to be treated, and which enter at an angle to the direction of motion and are conveniently divided into a plurality of zones. In the first zone, which is immediately adjacent to the inlet, the riffles will graduate from two to four times the size of the largest particle to be treated. In the second zone, where spreading and distribution are completed, the riffles will have a uniform height generally equal to twice the size of the largest particle to be treated, and in the third and fourth zone the height of the riffles will decrease from that in the second zone to zero. These zones have been indicated in dotted lines in Figure 2, the first zone being defined by the dotted line 60, the second zone by the dotted line 61, the third zone being the portion to the left hand corner of the screen outside of the second zone and the fourth zone the right hand corner outside of the second zone. At the end of the screen in order to effect separation as hereinafter described an adjustably mounted deflecting bar or knife 62 is provided adjustably mounted on a screw shaft 63 having a suitable bearing and a handwheel 64 on the outer edge. On the side a deflector 65 is provided designed to separate the material into two chutes 66 and 67.

The material passing through the second trough B is divided equally by a slicing knife trough to knife R which divides the S of similar form between two chutes T and U, material equally between two chutes T and U, which lead respectively to the air tables D and F.

The general operation of the invention is as follows: The raw coal is delivered by the chute I above the screen G. The coal travels towards the chute J, while the finest dust is taken by the hood Q. The next finest dust is kept loose by the air over the compartment L and, not being able to receive the shaking motion of the screen, runs back by gravity to the portion of the screen above the compartment O. The portion of the screen above the compartment O will cause the larger particles to be returned to the screen above the compartment L, while the fine dust will pass out through the chute P. By a proper regulation of the air pressure it is possible to effect a stratification of the material into layers of equivalent particles, that is to say particles that will have the same speed of free fall in air, and not a division with clean coal on top and refuse at the bottom. The knife R will divide the outflowing material into two slices which are equal in quantity but without regard to their ash content, and the lower slice will pass to the air tables C and E.

On the air tables the riffles, which in practice run in height from 1/8" to 0", effect a separation in the following manner: The shaking motion of the table moves the products across the table; the riffles maintain the products, preventing them rolling down the incline to the sides of the table.

Assuming, for instance, two equivalent particles of coal and rock. The rock would have the smaller size, being of greater specific gravity. Then, in this motion, as these two particles slide along a riffle of decreasing height, they will only roll over by gravity, when the centre of gravity will top the edge of the riffle. Then the coal will roll over first.

The final separation of the material into clean coal, middlings and refuse is accomplished by the knife 62 and the deflector 65, the clean coal passing through the chute 66, the middlings passing through the chute 67 and the refuse or rock passing through a chute 70. The knife 62 is adjusted to select the last riffle producing rock and in this way the last product from the other riffles is positively kept out.

An illustration of the application of the invention to slack coal may be given. Assuming that the coal to be cleaned has been passed through a ⅛" screen, most of this clean coal will have a specific gravity of 1.3 to 1.5; the specific gravity of the impurities will be between 1.6 to 1.9, with the majority at 1.7. Out of the first trough the top product separated will contain:

Coal—sizes 1/32" to 0"

Impurities—1/64" to 0"

this top product passing out through the chute P. The second product, passing through the chute J, is formed into two slices as explained. The top slice will contain:

Coal from 1/16" to 1/32"

Impurities from 1/32" to 1/64"

The bottom slice will contain:

Coal from ⅛" to 1/16"

Impurities from ⅛" to 1/32"

The bottom slice will be fed to the air tables C and E as already explained.

From the second trough the top slice will contain:

Coal—3/64" to 1/32"

Impurities—1/128" to 1/64"

The bottom slice will contain

Coal—1/16" to 3/64"

Impurities—1/32" to 1/128"

The impurities carried by fine slack coal are mostly made of shales more friable than pieces of sandstone, and these will be mostly found in the coarser sizes. These shales are often more friable than the coal, and always contain from 30% to 50% of combustible material.

The slope of the air tables and the size of the riffles will be adjusted to suit the material being treated. On the air tables the particles of coal and products will be maintained loose by the air pressure, permitting the separation to be effected by the riffles as already explained. This separation, it may be noted, is different from separation as ordinarily effected on air tables, where what is known as banking is used to separate the refuse, a wall of rock being created to stop the coal or middlings from coming with the refuse.

In the present invention each riffle is a separate cleansing unit, and the final separation is effected positively by the deflecting bar.

The air tables may be given a shaking motion by suitable eccentric and link connections. Conveniently all the tables and troughs may be operated from the same main shaft but set at different angles to produce a proper balance. The main shaft may be conveniently driven at a speed variable from 325 to 400 revolutions per minute.

Air troughs for the purpose of effecting separation between coal and impurities are already known which operate like a water trough, namely by subjecting the material to air pulsations produced under a flowing bed of coal. In such troughs the purpose is the separation of the coal on top and the refuse at the bottom. Some of these troughs scrape the refuse from the bottom; others scrape the clean coal from the top. According to the present process, however, material is classified and sliced. The classification is a stratification by equivalents. There is no attempt to make a bed with clean coal on top and refuse at the bottom, but only to put together at the same level equivalent particles, that is to say particles that would have the same speed of free fall in air. The products being classified, instead of being separated by qualities, are separated by quantities. There is no attempt to make a slice of any set or relative ash content, but, for example, the operation that takes place in the first trough is: first, one top slice by gravity alone; second, out of the balance two slices are taken equal in quantities without any regard to their ash content, and in the second trough two slices are made equal in quantities. In previous processes the top products were always lower in ash than the bottom ones. In the present process it may frequently happen that the lower layer is the lowest in ash.

Although my invention has been described in connection with the cleaning of fine coal, it will be readily understood that it may be readily applied to the separation of all sorts of material, including coals, minerals and grains, where a separation is desired between particles of different sizes and densities. In coal treating the invention may be applied to all sizes from 0" to 2½".

The circulation of the large quantities of air through the troughs as explained also performs a drying function, and if desired the primary trough might be used as a very efficient and convenient dryer, in which case the top of the trough will be closed and the air blown would be heated.

Various modifications may be made in the invention without departing from the spirit thereof or the scope of the claims and therefore the exact forms shown are to be taken as illustrative only and not in a limiting sense, and I desire that only such limitations shall be placed thereon as are imposed by the prior art or are specifically set forth in the appended claims.

What I claim as my invention is:

1. The herein described method of air-cleaning fine coals which comprises producing a stratified flowing stream of coal and refuse, moving in one direction, in which the particles of coal and refuse in each layer are of different specific gravity and size but have the same speed of free fall in air, then separating the layers and then causing the separated layers to move in a direction substantially transverse to the initial direction of movement and separating the particles of coal and refuse in each layer according to size.

2. Apparatus of the character described comprising in combination a stepped and inclined shaking screen, means for moving the screen slowly in the direction of flow and quickly against the direction of flow, a dust compartment at the lower end of said screen, into which dust flows mainly by gravity from a point adjacent a supply means, said supply means being adjacent said lower end, means for supplying regulated air currents to the lower side of said screen, and means for conveying material other than dust up said inclined screen from said supply means to the upper end of the screen while at the same time stratifying the particles of said material according to speed of free fall in air.

3. An apparatus for separating a mixture of materials of different specific gravities and wherein the particles are of different sizes comprising in combination a pair of stepped and perforated jigging tables, arranged the one behind the other and upwardly inclined in the direction of motion of the bulk of said materials, means for supplying air therebeneath whereby to stratify the material into layers of equivalent particles, means for withdrawing the top layer of said materials at the lower end of the first table, means for slicing the forwardly moving material at the upper end of the first table, whereby the upper slice only passes on to the second table and means for classifying the bottom slice, and the material passing from the upper end of the second table.

4. An apparatus as claimed in claim 3 in which the means for classifying the material of the slices consists of a shaking screen, inclined in a direction at right angles to the direction of shaking, and downwardly with respect to the direction of flow of the material and having riffles thereon of gradually diminishing depth, means to pass air upwardly therethrough and means for drawing off the separated products at the lower edge and the edge remote from the feed of said table.

5. An apparatus for separating a mixture of materials of different specific gravities and wherein the particles are of different sizes comprising in combination a pair of stepped and perforated jigging tables, arranged the one behind the other and upwardly inclined in the direction of motion of the bulk of said materials, means for supplying air therebeneath whereby to stratify the material into layers of equivalent particles, means for withdrawing the top layer of said material, including refuse and fine particles, at the lower end of the first table, means for returning the relatively coarser of the fine particles to the layers of material on the first table, means for slicing the forwardly moving material at the upper end of the first table, whereby the upper slice only passes on to the second table and means for classifying the bottom slice, and the material passing from the upper end of the second table.

GUSTAVE ANDRE VISSAC.